United States Patent
Digiuni (10) Patent No.: US 10,010,211 B2
(45) Date of Patent: Jul. 3, 2018

(54) SYSTEM FOR MAKING BEVERAGES

(71) Applicant: Caffitaly System S.p.A., Gaggio Montano-Bologna (IT)

(72) Inventor: Paolo Digiuni, Montagnola (CH)

(73) Assignee: Caffitaly System S.p.A., Gaggio Montano-Bologna (IT)

(*) Notice: Subject to any disclaimer, the term of this patent is extended or adjusted under 35 U.S.C. 154(b) by 193 days.

(21) Appl. No.: 14/401,547

(22) PCT Filed: May 13, 2013

(86) PCT No.: PCT/IB2013/053868
§ 371 (c)(1),
(2) Date: Nov. 17, 2014

(87) PCT Pub. No.: WO2013/171649
PCT Pub. Date: Nov. 21, 2013

(65) Prior Publication Data
US 2015/0157164 A1 Jun. 11, 2015

(30) Foreign Application Priority Data

May 15, 2012 (IT) .............................. VR2012A0093

(51) Int. Cl.
*A47J 31/40* (2006.01)
*A47J 31/06* (2006.01)
(Continued)

(52) U.S. Cl.
CPC ......... *A47J 31/407* (2013.01); *A47J 31/0673* (2013.01); *A47J 31/3628* (2013.01); *B65D 85/8043* (2013.01)

(58) Field of Classification Search
CPC .... A47J 31/0673; A47J 31/407; A47J 31/007; A47J 31/02; A47J 31/057; A47J 31/0668; A47J 31/0689
(Continued)

(56) References Cited

U.S. PATENT DOCUMENTS

| 845,968 A | * | 3/1907 | Murray | .................. A47J 31/02 99/293 |
| 3,579,351 A | * | 5/1971 | Wege et al. | .......... B65D 85/808 426/82 |

(Continued)

FOREIGN PATENT DOCUMENTS

| CA | 2419015 A1 * | 9/2003 | .......... A47J 31/0673 |
| WO | 2005090196 A1 | 9/2005 | |

(Continued)

OTHER PUBLICATIONS

European Search Report corresponding to PCT/IB2013/053868, dated Jul. 23, 2013 (3 pages).

*Primary Examiner* — Jimmy Chou
(74) *Attorney, Agent, or Firm* — Maginot, Moore & Beck, LLP (57) ABSTRACT

A system (1) for making beverages comprises a capsule holder (11) and a capsule (2) containing a powdered food substance which can be extracted to make a beverage; the capsule (2) comprises a body (3) comprising a lower wall (4), a lateral wall (5), a lid (7) and a filter bag (9). The system (1) also comprises injection means (13) for injecting water into the capsule (2) through the lid (7) and collecting means (16) comprising a piercing element (17) for piercing the lower wall (4). The inside of the capsule (2), at the lower wall (4), comprises a protection element (20) for preventing contact between the piercing element (17) and the filter bag (9). The protection element (20) together with at least the lower wall (4) forms an annular chamber (21), extending
(Continued)

around an axis of extension (8) and being in fluid communication with the filter bag (9), and forms a seat (33) facing towards the lid (7), in which a lower part (37) of the filter bag (9) is inserted, and which is surrounded by the annular chamber (21). The piercing element (17) is positioned off center relative to the axis of extension (8), passes through the lower wall (4) at the annular chamber (21) and is partly inserted in said chamber.

18 Claims, 3 Drawing Sheets

(51) Int. Cl.
*A47J 31/36* (2006.01)
*B65D 85/804* (2006.01)

(58) Field of Classification Search
USPC ..... 99/282, 283, 284, 286, 287, 289 R, 291, 99/295, 296, 298, 307, 323
See application file for complete search history.

(56) References Cited

U.S. PATENT DOCUMENTS

| | | | | |
|---|---|---|---|---|
| 3,615,708 A * | 10/1971 | Abile-Gal | ........... | B65D 85/8043 210/474 |
| 3,971,305 A * | 7/1976 | Daswick | ........... | B65D 85/8043 210/474 |
| 4,204,966 A * | 5/1980 | Morgan, Jr. | ........... | B01D 29/23 210/232 |
| 5,325,765 A * | 7/1994 | Sylvan | ........... | A47J 31/0673 426/433 |
| 6,079,315 A * | 6/2000 | Beaulieu | ........... | A47J 31/3628 99/289 R |
| 6,189,438 B1 * | 2/2001 | Bielfeldt | ........... | A47J 31/08 210/493.5 |
| 6,607,762 B2 * | 8/2003 | Lazaris | ........... | B65D 85/8043 206/0.5 |
| 6,645,537 B2 * | 11/2003 | Sweeney | ........... | B65D 85/8043 206/222 |
| 7,318,372 B2 * | 1/2008 | Cooke | ........... | A47J 31/46 99/284 |
| 7,552,672 B2 * | 6/2009 | Schmed | ........... | B65D 85/8043 426/115 |
| 7,856,920 B2 * | 12/2010 | Schmed | ........... | A47J 31/0673 99/289 R |
| 7,946,217 B2 * | 5/2011 | Favre | ........... | A47J 31/0668 426/433 |
| 8,039,034 B2 * | 10/2011 | Ozanne | ........... | A47J 31/0615 426/425 |
| 8,221,813 B2 * | 7/2012 | Boul | ........... | A47J 31/08 210/455 |
| 8,361,527 B2 * | 1/2013 | Winkler | ........... | A47J 31/3695 426/77 |
| 8,443,717 B2 * | 5/2013 | Venturi | ........... | B65D 85/8043 426/77 |
| 8,474,368 B2 * | 7/2013 | Kilber | ........... | 426/77 |
| 8,720,320 B1 * | 5/2014 | Rivera | ........... | A47J 31/0678 99/295 |
| 8,794,125 B1 * | 8/2014 | Rivera | ........... | A47J 31/08 99/295 |
| 9,120,617 B2 * | 9/2015 | Beer | ........... | B65D 85/8043 |
| 9,150,347 B2 * | 10/2015 | Scheiber | ........... | B65D 85/8043 |
| 9,216,854 B2 * | 12/2015 | Schreiber | ........... | B65D 85/8043 |
| 9,232,871 B2 * | 1/2016 | Rivera | ........... | A47J 31/0689 |
| 2003/0222089 A1 * | 12/2003 | Hale | ........... | B65D 85/8043 220/574 |
| 2004/0211322 A1 * | 10/2004 | Halliday | ........... | A47J 31/0673 99/279 |
| 2005/0034604 A1 * | 2/2005 | Halliday | ........... | A47J 31/0673 99/279 |
| 2005/0066819 A1 * | 3/2005 | Cooke | ........... | A47J 31/46 99/275 |
| 2005/0103204 A1 * | 5/2005 | Halliday | ........... | A47J 31/446 99/295 |
| 2005/0150390 A1 * | 7/2005 | Schifferle | ........... | B65D 85/8043 99/295 |
| 2005/0223904 A1 * | 10/2005 | Laigneau | ........... | A47J 31/3695 99/295 |
| 2006/0107841 A1 * | 5/2006 | Schifferle | ........... | A47J 31/0668 99/279 |
| 2006/0219098 A1 * | 10/2006 | Mandralis | ........... | A47J 31/36 99/279 |
| 2006/0236871 A1 * | 10/2006 | Ternite | ........... | B65D 85/8043 99/295 |
| 2007/0181003 A1 * | 8/2007 | Bardazzi | ........... | B65D 85/8043 99/279 |
| 2008/0245236 A1 * | 10/2008 | Ternite | ........... | A47J 31/0668 99/295 |
| 2009/0110775 A1 * | 4/2009 | Rijskamp | ........... | A47J 31/3628 426/77 |
| 2009/0126577 A1 * | 5/2009 | Ternite | ........... | A47J 31/0673 99/295 |
| 2009/0199518 A1 * | 8/2009 | Deuber | ........... | A47J 31/3628 53/492 |
| 2010/0000415 A1 * | 1/2010 | Vanni | ........... | B65D 85/8043 99/295 |
| 2010/0064899 A1 * | 3/2010 | Aardenburg | ........... | A47J 31/3633 99/295 |
| 2010/0129512 A1 * | 5/2010 | Accursi | ........... | A47J 31/0673 426/431 |
| 2010/0203207 A1 * | 8/2010 | Clark | ........... | A47J 31/32 426/431 |
| 2010/0206177 A1 * | 8/2010 | Ricotti | ........... | A47J 31/0673 99/295 |
| 2010/0269705 A1 * | 10/2010 | Zonelli | ........... | A47J 31/3628 99/295 |
| 2010/0282088 A1 * | 11/2010 | Deuber | ........... | A47J 31/52 99/281 |
| 2010/0288131 A1 * | 11/2010 | Kilber | ........... | B65D 85/8043 99/295 |
| 2011/0111098 A1 * | 5/2011 | Ricotti | ........... | A47J 31/0642 426/89 |
| 2011/0151075 A1 * | 6/2011 | Peterson | ........... | A47J 31/002 426/238 |
| 2011/0183055 A1 * | 7/2011 | Mariller | ........... | A47J 31/0673 426/433 |
| 2011/0259207 A1 * | 10/2011 | Ozanne | ........... | C02F 1/42 99/323.3 |
| 2011/0305801 A1 * | 12/2011 | Beer | ........... | B65D 85/8043 426/77 |
| 2012/0058226 A1 * | 3/2012 | Winkler | ........... | A47J 31/3695 426/79 |
| 2012/0121768 A1 * | 5/2012 | Lai | ........... | A47J 31/3623 426/231 |
| 2012/0121780 A1 * | 5/2012 | Lai | ........... | A47J 31/3623 426/433 |
| 2012/0171332 A1 * | 7/2012 | Lai | ........... | A47J 31/42 426/78 |
| 2012/0207895 A1 * | 8/2012 | Rivera | ........... | A47J 31/0689 426/433 |
| 2012/0258210 A1 * | 10/2012 | Wong | ........... | A47J 31/3695 426/115 |
| 2012/0260806 A1 * | 10/2012 | Rolfes | ........... | A47J 31/38 99/285 |
| 2012/0263829 A1 * | 10/2012 | Kamerbeek | ........... | A47J 31/0673 426/77 |

(56) References Cited

U.S. PATENT DOCUMENTS

2012/0285330 A1* 11/2012 Demiglio ............ A47J 31/0689
                                                    99/279
2012/0308688 A1* 12/2012 Peterson ............... A47J 31/002
                                                    426/86
2015/0059588 A1*  3/2015 Castellani .......... A47J 31/0647
                                                    99/295

FOREIGN PATENT DOCUMENTS

| WO |    2009008723 A1   | 1/2009 |
| WO | WO 2009008723 A1 * | 1/2009 |
| WO |    2010046923 A1   | 4/2010 |

* cited by examiner

SYSTEM FOR MAKING BEVERAGES

This invention relates to a system for making beverages. In particular reference is made to those systems for making beverages based on capsules containing a powdered food substance (for example coffee powder) which can be extracted by passing water (which may be pressurised) through it to make a beverage (for example coffee). However, in the context of this invention, the term powdered food substance refers to any substance which can be extracted by infusion or which is soluble, for example coffee, tea, infusions, soups, etc.

More particularly reference is made to those systems which use capsules comprising a substantially cup-shaped body, composed of a lower wall and a lateral wall, a lid which closes the top of the body and a filter bag positioned inside the body and in which the powdered food substance is located.

In more detail, the invention is intended for those systems for making beverages which inject water through the lid and extract the beverage through the lower wall of the capsule. The water injected into the capsule makes contact with the powdered food substance inside the filter bag which allows the beverage made in this way to pass through but retains the powdered food substance, preventing it from leaving the capsule. Such systems, in particular, comprise beverage collecting means comprising a needle used to pierce the lower wall of the capsule to allow the beverage to come out through the hole made in that way (or between the needle and the lower wall or through a channel made in the needle itself). If the needle or a piercing element in general were to make contact with the filter bag, the latter could be pierced and no longer fulfil its function, the result being that part of the powdered food substance could come out with the beverage.

Consequently, prior art systems use strategies for avoiding contact between the piercing element and the filter bag. However, these prior art systems have several disadvantages.

For example, U.S. Pat. No. 5,325,765 describes a capsule containing a filter bag which is sealed to the lateral wall at the lid of the capsule. Contact between the filter bag and the piercing element is avoided by the substantially conical or frustoconical shape of the filter bag itself which narrows, along an axis of extension substantially perpendicular to the lid and to the lower wall and passing through the centre of them, from a wider cross-section at the lid to a narrower cross-section at the lower wall. The piercing element passes through the lower wall off centre relative to the axis of extension and penetrates the inside of the capsule in such a way that it does not intercept the filter bag. However, since the filter bag is flexible, the part of the filter bag which forms the tip of the cone could move on the lower wall and come out of alignment with the axis of extension (for example following movements of the capsule), causing the filter bag to intercept the piercing element.

In contrast, patent US 2010/0288131 describes a capsule substantially similar to that just presented, the difference being that the filter bag substantially has a frustoconical shape, with the smaller base of it facing towards the lower wall and distanced from it by a distance which is greater than the maximum distance from the lower wall which the tip of the piercing element reaches when it penetrates inside the capsule.

However, both of these solutions require special filter bag shapes. Such special filter bag shapes (with an accentuated taper or a reduced height) means that the space inside the filter bag is decidedly less than that available inside the body of the capsule. Consequently, the quantity of powdered food substance which can be stored in the capsule is decidedly less than that which can be stored in the internal space formed by the body of the capsule. Moreover, such solutions require the filter bag to be glued or sealed to the lateral wall of the body or to the lid and that it is suspended in such a way that it is raised off the lower wall. Therefore, a high level of filter bag fixing strength must be guaranteed, since if the filter bag becomes detached, for example during capsule transportation or due to a simple jolt, it would compromise use of the capsule, since it could cause the filter bag to break after the piercing element has penetrated inside the capsule.

Patent US 2011/0076361 also describes a capsule which has a disk-shaped base positioned on the lower wall and on which the filter bag can rest. The disk-shaped base has a hole made at the centre of it. The entry of the piercing element through the lower wall occurs off centre and therefore not at the central hole. After the piercing element has penetrated the capsule, it impacts against the face of the disk-shaped base opposite to that on which the filter bag rests, laterally lifting the base until it reaches a position in which it is at an angle relative to the lower wall and consequently lifting the filter bag which in that way cannot make contact with the piercing element. However, such a solution means that the filter bag cannot be completely filled with powdered food substance. Moreover, lifting the base compresses the powdered food substance between the base and the lid, therefore causing packing of the powdered food substance which hampers the passage of the water through the packed powder, especially when the water is not pressurised. Moreover, since the base is angled, the compression of the powdered food substance occurs mainly in a region at the portion of the base lifted furthest away from the lower wall, that is to say, that at the piercing element. The water entering the capsule, encountering greater resistance at the region where the powdered food substance is compressed, creates a preferred path in the region where it is less compressed, meaning that it does not permeate the powdered food substance evenly. Moreover, the angling of the base promotes the accumulation of beverage in the filter bag region at the portion of base in contact with the lower wall, thereby obstructing the discharge of the beverage In this context, the technical purpose which forms the basis of this invention is to provide a system for making beverages which overcomes the above-mentioned disadvantages.

In particular, the technical purpose of this invention is to provide a system for making beverages which allows a large quantity of powdered food substance to be stored in the capsule, the filter bag to be kept intact, and which allows homogeneous permeation, that is to say, wetting, of the powdered food substance.

The technical purpose specified and the aims indicated are substantially achieved by a system for making beverages as described in the appended claims.

Further features and the advantages of this invention are more apparent in the detailed description, with reference to the accompanying drawings which illustrate several preferred, non-limiting embodiments of a system for making beverages, in which.

With reference to the accompanying drawings, the numeral 1 denotes in its entirety a system for making beverages according to this invention.

The system 1 according to this invention comprises a capsule 2 containing at least one powdered food substance which can be extracted by passing water through it to make a beverage. The powdered food substance, for example powdered coffee, can be extracted for example by infusion or is soluble to make a beverage such as coffee or tea, infusions, soups, etc.

Figure 2:
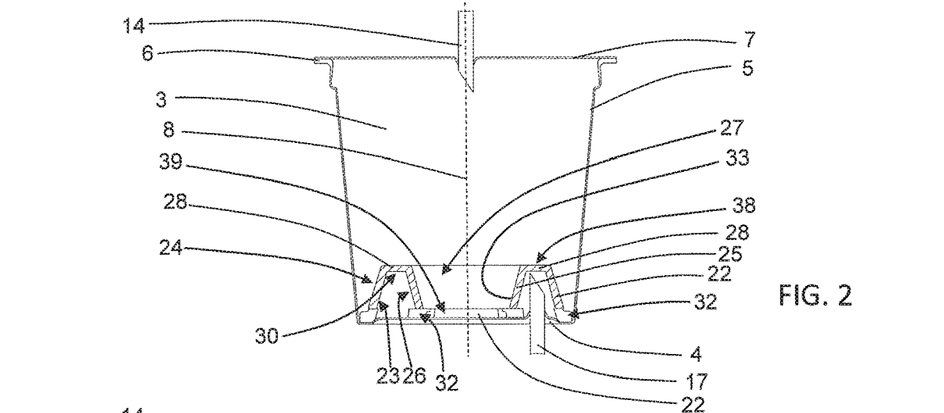
FIG. 2 is a vertical cross-section of the system of FIG. 1 in which the filter bag has been removed.

The capsule 2 comprises a substantially cup-shaped body 3 which in turn comprises a lower wall 4 and a lateral wall 5 connected to the lower wall 4. In the preferred embodiments illustrated in the accompanying drawings, the lower wall 4 is substantially circular and the lateral wall 5 extends substantially with a conical shape: consequently the body 3 of the capsule 2 is substantially frustoconical. However, in alternative embodiments the lower wall 4 of the capsule 2 may adopt different shapes and the lateral wall 5 may be shaped accordingly, just as the lateral wall 5 may adopt different shapes and for example may be substantially cylindrical. The lateral wall 5 in particular, advantageously extends from the lower wall 4 to form an upper edge 6. The capsule 2 also comprises a lid 7 which closes the top of the body 3 and is advantageously sealed at the upper edge 6. Between a central point of the lid 7 and a central point of the lower wall 4 there is an axis of extension 8 of the capsule 2, passing through said central points (FIG. 2).

Figure 1:
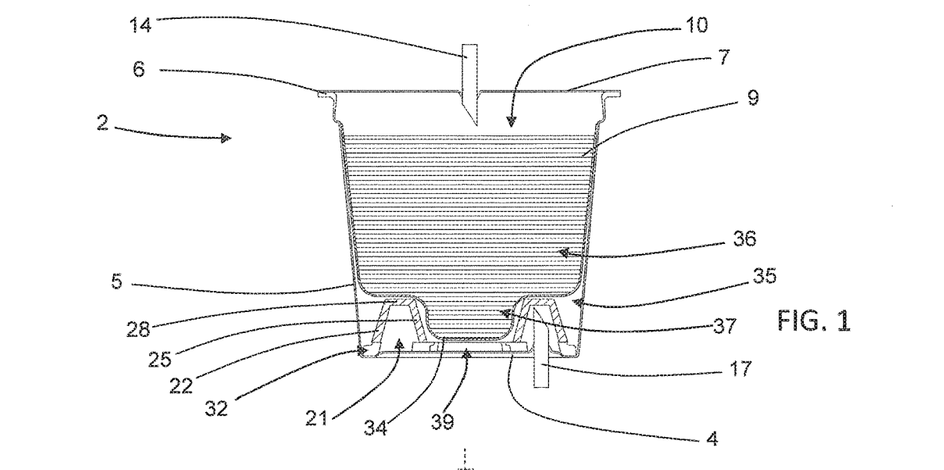
FIG. 1 is a vertical cross-section of part of a system, in accordance with this invention, comprising a capsule, injection means and collecting means.
Figure 3:
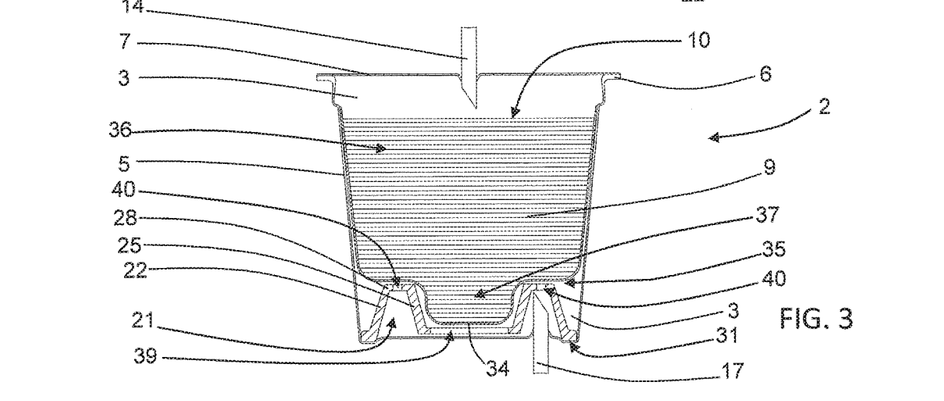
FIG. 3 is a vertical cross-section of a second embodiment of the system of FIG. 1.
Figure 4:
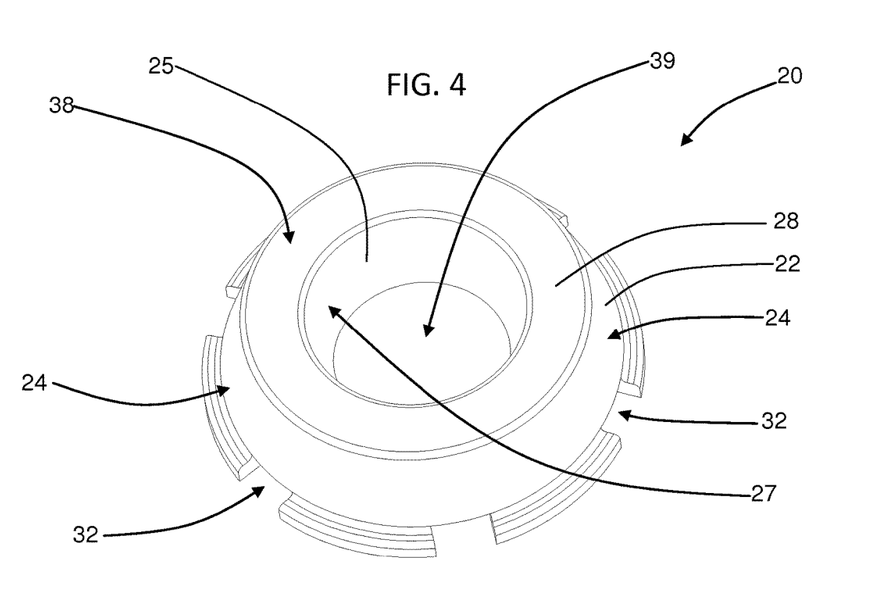
FIG. 4 is an axonometric top view of a detail of the system of FIG. 1.

The capsule 2 also comprises a filter bag 9 inserted in the body 3 for separating the powdered food substance at least from the lower wall 4. Advantageously, in the preferred embodiment the filter bag 9 comprises at its top an upper opening 10 facing towards the lid 7 and preferably located close to the lid 7 in such a way as to contain the powdered food substance between itself and at least the lid 7. The filter bag 9 is advantageously connected to the lateral wall 5 or to the lid 7 substantially at the perimeter of the upper opening 10. In the embodiments illustrated it is sealed to the lateral wall 5 of the body 3 of the capsule 2, as shown in FIGS. 1 and 3. In other cases, the filter bag 9 may in contrast be directly sealed to the lid 7 of the capsule 2 at the upper opening 10 or may even be positioned between the upper edge 6 and the lid 7. Moreover, the filter bag 9 may be sealed at a substantially annular portion of the lateral wall 5 located in any intermediate position between the lid 7 and the lower wall 4. The filter bag 9 is advantageously made of a material which is permeable to the beverage, for example coffee, but which prevents the powdered food substance from passing through it.

Figure 6:
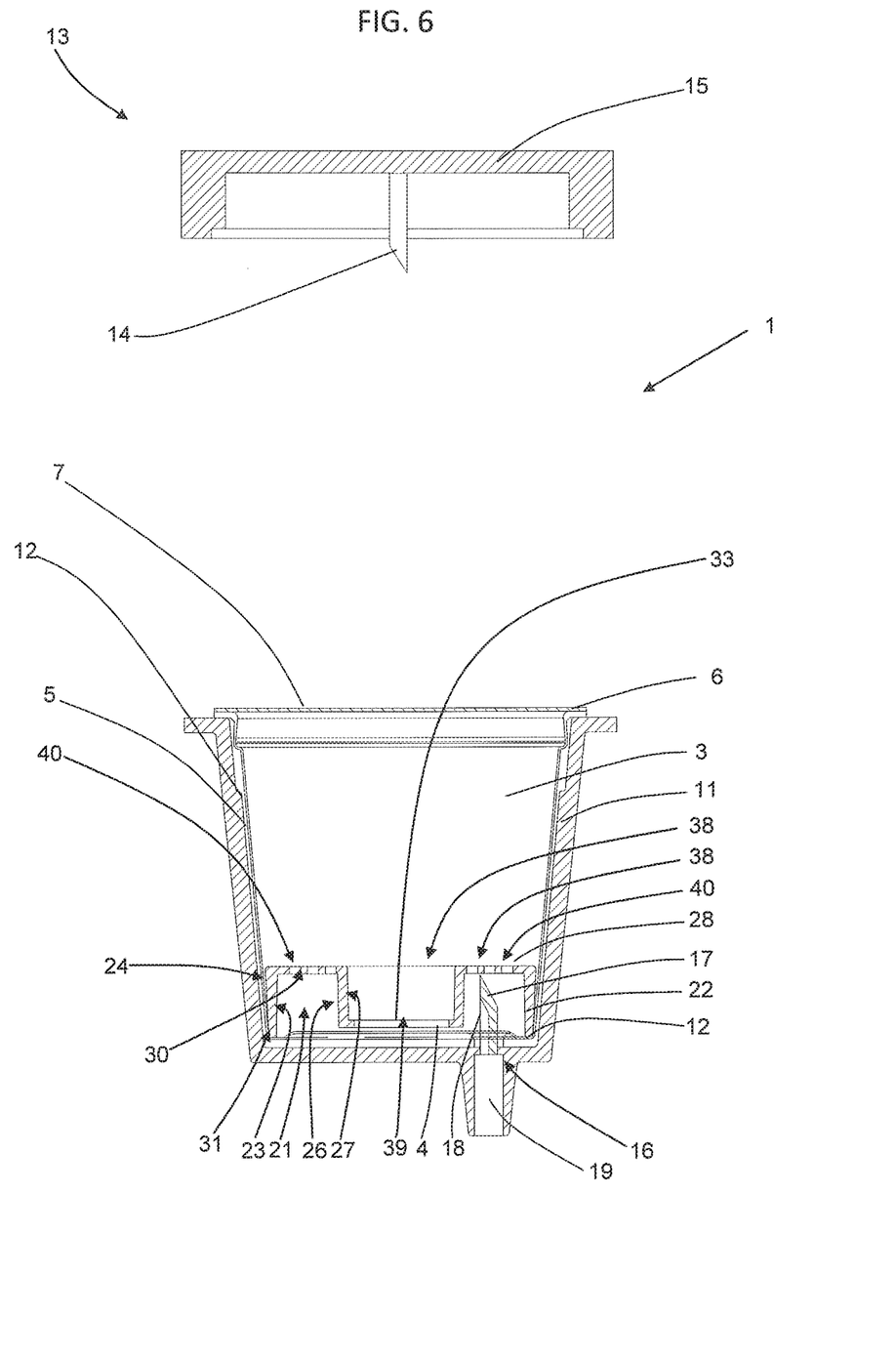
FIG. 6 is a vertical cross-section of a part of a system made in accordance with a third embodiment.

The system 1 also comprises a capsule holder 11, visible in FIG. 6 (but not shown in the other figures), forming a housing 12 inside it for accommodating the capsule 2. The capsule holder 11 advantageously also forms an upper entrance through which the capsule 2 can be inserted in the housing 12. Advantageously in the embodiments illustrated, the capsule 2 and the capsule holder 11 are such that, once the capsule 2 has been inserted in the housing 12, the lower wall 4 and the lateral wall 5 are near to the walls of the housing 12 whilst the lid 7 is at the entrance (as shown in FIG. 6). In fact, the housing 12 is advantageously shaped to match the capsule 2, that is to say, the lower wall 4 and the lateral wall 5. However, in other embodiments, there may also be other solutions.

The system 1 also comprises injection means 13 for injecting water into the capsule 2, the means being associated, directly or indirectly, with the capsule holder 11 for injecting water into the capsule 2 through the lid 7. Advantageously, the injection means 13 comprise at least one injection needle 14 (FIGS. 1 to 3 and 6) which allows the injection of liquid, most likely water, through the lid 7, substantially in the known way. The injection needle 14 may advantageously penetrate inside the body 3 of the capsule 2 inside the filter bag 9 at the upper opening 10. In the preferred embodiment the injection means 13 also comprise a contact element 15 (FIG. 6) against which the capsule 2 can rest substantially at the upper edge 6 and/or the lid 7. The contact element 15 and the capsule holder 11 can advantageously move relative to each other between an open position in which they are distanced from one another and allow insertion of the capsule 2 through the entrance (FIG. 6) and a closed position in which they are clamped together (not illustrated), if necessary retaining between them the upper edge 6 of the lateral wall 5 if it projects from the lateral wall 5 itself, to create a watertight seal between them. Advantageously, the injection needle 14 is mounted on the contact element 15 (FIG. 6) and penetrates through the lid 7 of the capsule 2 after the capsule holder 11 and the contact element 15 have passed from the open position to the closed position, or after the closed position has been reached, substantially in the known way. In an alternative embodiment (not illustrated) the watertight seal is not formed between the contact element 15 and the capsule 2 but instead it is obtained by means of only the contact between the lid 7 of the capsule 2 and a cylindrical seal which surrounds the injection needle 14. After the lid 7 has been pierced by the injection needle 14, the cylindrical seal rests on the lid 7 itself. The water injected into the capsule 2 applies a pressure to the lid 7 which allows an increase in the adhesion between the lid 7 and the cylindrical seal, thereby creating the watertight seal.

The system also comprises collecting means 16 for collecting the beverage which are mounted in the capsule holder 11 at the housing 12 for collecting the beverage which comes out through the lower wall 4. The collecting means 16 may be of various types and advantageously allow collection of the beverage coming out of the capsule 2 when the latter is inserted in the housing 12 with the capsule holder 11 and the contact element 15 in the closed position. As shown in the accompanying Figures from 1 to 3 and 6, the collecting means 16 comprise at least one piercing element 17 for, in use, making a hole in the lower wall 4 through which the beverage can come out of the capsule 2. Advantageously, the piercing element 17 is hollow and allows the beverage to come out through it. In contrast, in other embodiments, such as that shown in FIG. 6, the piercing element 17 is not hollow and the beverage comes out, for example, between the piercing element 17 itself and the lower wall 4. For example, in the embodiment illustrated in FIG. 6, the piercing element is substantially a blade which has a groove 18 on its surface which, being recessed relative to the outline of the blade, forms a passage between the blade itself and the lower wall 4 through which the beverage can come out of the capsule 2. The collecting means 16 comprise a dispensing duct 19 which allows the beverage to be conveyed towards its destination, probably a dispensing spout. However, in the context of this invention, the term piercing element 17 refers to any element able to pierce or tear the lower wall 4 and to at least partly penetrate inside the capsule 2. Advantageously, in the preferred embodiments, the piercing element 17 penetrates inside the capsule 2 after the capsule holder 11 and the contact element 15 have passed from the open position to the closed position, or when they are already in the closed position, substantially in the known way. In the former case, for example, the piercing element 17 will be mounted in the capsule holder 11 at the housing 12 and may be fixed to the capsule holder 11 (FIG. 6). In contrast, in the latter case the piercing element 17 may be associated with an element which is mobile relative to the capsule holder 11 which, after a movement, when the capsule 2 is inserted in the housing 12 between the contact element 15 and the capsule holder 11, may pierce the lower wall 4 (solution not illustrated).

Returning to the description of the capsule 2, it also comprises a protection element 20 positioned inside the body 3, substantially at the lower wall 4, for preventing contact between the piercing element 17 and the filter bag 9 (FIGS. 1 to 6 and in particular 4 and 5).

The protection element 20 forms an annular chamber 21 between itself and at least the lower wall 4. In the preferred embodiments illustrated, since the lower wall 4 is substantially circular, the protection element 20 is also at least mainly circular if seen according to the axis of extension 8: in that case the annular chamber 21 will advantageously also have a mainly circular extension and in particular, as shown more clearly in FIGS. 4 and 5, it will have a substantially toroidal shape. However, the protection element 20 may have different shapes. In general, as described in more detail below, the shape of the protection element 20 may also differ from that of the lower wall 4.

More precisely, the protection element 20 forms the annular chamber 21 between itself and at least a substantially annular portion of the lower wall 4. However, advantageously, the protection element 20 may also form the annular chamber 21 between itself, the lower wall 4 and the lateral wall 5 and in particular, with reference to the latter, at a substantially annular portion of it.

The annular chamber 21 is inside the body 3, is located between the lower wall 4 and the lid 7, and extends about the axis of extension 8. As described in more detail below, during operation the piercing element 17 pierces the lower wall 4 off centre relative to the axis of extension 8 and at the annular chamber 21. In fact, in the preferred embodiments illustrated, advantageously, the protection element 20 forms an annular chamber 21 with circular extension which substantially always remains at the same distance from the axis of extension 8. In that way, whatever the orientation of the capsule 2, or its rotation about the axis of extension 8, depending on the shape of the capsule 2 and of the housing 12, the piercing element 17 always pierces the lower wall 4 at the annular chamber 21.

In the embodiments illustrated in FIGS. 1 to 3 and 6, the capsule 2 is symmetrical about the axis of extension 8. Consequently, the annular chamber 21 extends, about the axis of extension 8, following the extension of the lateral wall 5 about the axis of extension 8. The capsule 2 may be positioned in the housing 12 rotated about the axis of extension 8 as desired and in any case the piercing element 17 will always penetrate the lower wall 4 at the annular chamber 21.

As already indicated, when the capsule 2 is inserted in the housing 12, the piercing element 17 is positioned off centre relative to the axis of extension 8, passes through the lower wall 4 and, after piercing, is partly inserted in the body 3 at the annular chamber 21. In that way the piercing element 17 penetrates inside the capsule 2 inside the annular chamber 21 formed by the protection element 20, therefore avoiding contact with the filter bag 9 which is kept distanced from the lower wall 4 of the protection element 20. Advantageously, the piercing element 17 is calibrated to penetrate the capsule 2 by a distance which is less than the height of the annular chamber 21 in a direction substantially parallel with the direction of action of the piercing element 17 (which is advantageously parallel with the axis of extension 8).

The shape of the annular extension of the annular chamber 21 and its position on the lower wall 4, or its distance from the axis of extension 8, are closely related to the position of the piercing element 17 (or more than one of them if there are multiple elements), and vice versa. In other words, depending on the misalignment (in terms of distance) between the position of the piercing element 17, or the point it identifies on the lower wall 4 where penetration occurs, and the direction identified by the axis of extension 8, the position of the annular chamber 21 will also vary. In particular, the annular chamber 21 is located on the lower wall 4 in a position such that the piercing element 17 penetrates the lower wall 4 at it. In that way, the piercing element 17, penetrating the capsule 2, will be partly inserted in the annular chamber 21. The annular chamber 21 will advantageously extend more according to the direction of action of the piercing element 17, which in the preferred embodiments illustrated is advantageously parallel with the axis of extension 8.

In the embodiments illustrated, the protection element 20 is substantially a rigid or semi-rigid structure which rests, inside the body 3 of the capsule, on the lower wall 4. In other embodiments the protection element 20 may in contrast be an integral part of the lower wall 4 and/or of the lateral wall 5 of the body 3 of the capsule 2. In yet other embodiments the protection element 20 may in contrast be in contact with only the lateral wall 5, although it is advantageously positioned near to or at the lower wall 4.

Advantageously, in the embodiments illustrated, proceeding from the lateral wall 5 towards the axis of extension 8, the protection element 20 comprises a substantially annular first wall 22, having a first inner face 23 and a first outer face 24, and a substantially annular second wall 25, having a second inner face 26 and a second outer face 27. In FIGS. 1 to 3 and 6 the first wall 22 is the one closest (or which starts at a point closest) to the lateral wall 5, while the second wall 25 is that positioned internally relative to the first wall 22, with reference to the axis of extension 8, that is to say, it is the wall which ends at a point further from the lateral wall 5.

The second wall 25 is advantageously connected to the first wall 22 by means of a substantially annular connecting portion 28. The connecting portion 28 may be of various types. It may be simply formed by the substantially annular portion where there is contact between the first wall 22 and the second wall 25 (solution not illustrated). In contrast, in the embodiment illustrated the connecting portion 28 has a certain width and separates the first wall 22 and the second wall 25, distancing them from each other where it is located. In particular, as is shown more clearly in FIG. 4, the connecting portion 28 is substantially shaped like a circular crown whose surface is substantially flat and extends substantially parallel with the lower wall 4. In other embodiments the surface of the connecting portion 28 may be variously curved, for example concave, convex, corrugated, etc.

As already indicated, the first wall 22 and the second wall 25 delimit the annular chamber 21. Moreover, advantageously, at least one out of the first wall 22 and the second wall 25 extends away from the lower wall 4. That is to say, at least one out of the first wall 22 and the second wall 25 will from two edges 29 at its ends, one of which will be closer to the lower wall 4 than the other: at least one out of the first wall 22 and the second wall 25 will therefore not be parallel with the lower wall 4. In other words, observing a cross-section identified by a plane passing through the axis of extension 8, at least one out of the first wall 22 and the second wall 25 extends at least mainly transversally to the lower wall 4. In other words, observing again in cross-section, at least one out of the first wall 22 and the second wall 25 extends at least mainly in a direction which is transversal but not orthogonal to that defined by the axis of extension 8.

Advantageously, the first wall 22 and the second wall 25 delimit the annular chamber 21 with the respective first inner face 23 and second inner face 26.

In the preferred embodiment illustrated, the first inner face 23 and the second inner face 26 are substantially opposite each other. Therefore, the protection element 20 delimits the annular chamber 21 with the first inner face 23, the second inner face 26 and a third inner face 30 formed by the side of the connecting portion 28 facing towards the lower wall 4.

As already indicated, advantageously, in the preferred embodiment the annular chamber 21 is formed between the protection element 20 and the lower wall 4. In the preferred embodiments illustrated in the accompanying drawings, both the first wall 22 and the second wall 25 extend away from the lower wall 4. In particular, in the case in FIGS. 1 to 5, the first wall 22 and the second wall 25 converge with each other as they extend away from the lower wall 4. Therefore, the annular chamber 21 is delimited by the first inner face 23, the second inner face 26, the third inner face 30 and the lower wall 4. Seen according to a cross-section identified by a plane passing through the axis of extension 8, at the annular chamber 21 the protection element 20 substantially has an inverted U shape.

In an alternative embodiment, only one out of the first wall 22 and the second wall 25 extends away from the lower wall 4. For example, the second wall 25 may extend substantially parallel with the lower wall 4 proceeding from the axis of extension 8 towards the lateral wall 5 as far as the connecting portion 28, where it meets the first wall 22 which in contrast extends away from the lower wall 4. In this alternative embodiment, the protection element 20, at the annular chamber 21, seen according to a cross-section identified by a plane passing through the axis of extension 8, substantially has an inverted L shape oriented inwards, that is to say, with the second wall 25 substantially projecting from the connecting portion 28 towards the axis of extension 8.

Alternatively, as already indicated, the annular chamber 21 may be formed between the protection element 20, the lower wall 4 and the lateral wall 5. In this case, it is possible that only the second wall 25 extends away from the lower wall 4. For example, the first wall 22 may extend substantially parallel with the lower wall 4 proceeding from the lateral wall 5 towards the axis of extension 8 as far as the connecting portion 28, where it meets the second wall 25 which extends away from the lower wall 4. In this case the protection element 20, at the annular chamber 21, seen according to a cross-section identified by a plane passing through the axis of extension 8, substantially has an inverted L shape oriented outwards, that is to say, with the first wall 22 substantially projecting from the connecting portion 28 away from the axis of extension 8.

Figure 5:
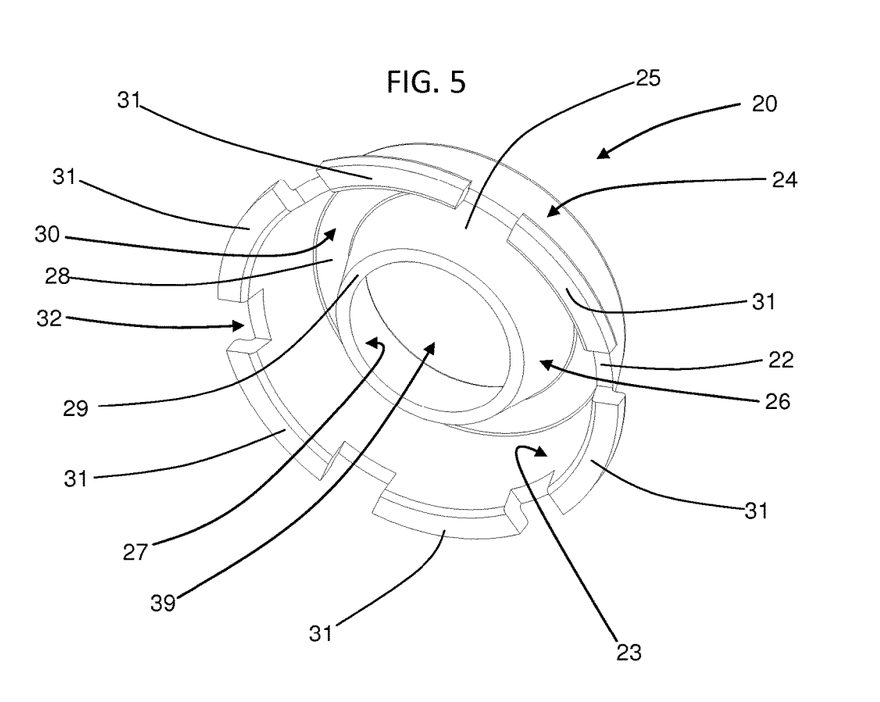
FIG. 5 is an axonometric bottom view of the detail from FIG. 4.

In the preferred embodiments illustrated in the accompanying drawings, the first wall 22 comprises, at the end opposite to the connecting portion 28, a first contact portion 31 (FIG. 5). Advantageously, the protection element 20 is substantially in contact with the body 3 of the capsule 2 by means of the first wall 22 at said first contact portion 31.

The first contact portion 31 is substantially in contact with the lower wall 4 or with the lateral wall 5. Advantageously, in the preferred embodiments, the first contact portion 31 is substantially in contact with the lower wall 4. Alternatively, for example in the case in which the first wall 22 extends away from the lateral wall 5, as in the above-mentioned example, the first contact portion 31 will be substantially in contact with the lateral wall 5.

In this context, the term contact refers to both fixing by interference and simply resting. Moreover, obviously, the first contact portion 31 may be connected (for example sealed) to the body 3 of the capsule 2 rather than simply being in contact with it.

Moreover, advantageously, in the preferred embodiment illustrated in FIGS. 1, 2, 4 and 5, the protection element 20 comprises one or more first passages 32 made at the first contact portion 31, said first passages 32 allowing fluid communication between the inside of the annular chamber 21 and the filter bag 9, or with the rest of the inside of the body 3 of the capsule 2. Said first passages 32 are made substantially at the first contact portion 31 and extend on the first wall 22. In that way, in the preferred embodiment illustrated in FIG. 1, the first passages 32 allow fluid communication through the space existing between the lateral wall 5 and the protection element 20 at the first wall 22. In fact, the annular chamber 21 is in fluid communication with the filter bag 9, that is to say, with the rest of the inside of the body 3 of the capsule 2.

Advantageously, the protection element 20 allows the filter bag 9 to be separated from the lower wall 4 at least at its portion forming the annular chamber 21. The protection element 20 forms a seat 33 for the filter bag 9 (FIG. 2). Said seat 33 is facing towards the lid 7 and is located at the centre of the annular chamber 21. In other words, relative to the axis of extension 8, the seat 33 is positioned radially inside the annular chamber 21, which therefore surrounds it. The filter bag 9 is partly inserted in the seat 33. Since the piercing element 17 acts off centre relative to the axis of extension 8 and at the annular chamber 21, it cannot make contact with the filter bag 9 even at the seat 33. Advantageously, the seat 33 substantially corresponds to a recess of the protection element 20 towards the lower wall 4, in the direction defined by the axis of extension 8, relative to the portion of the protection element 20 which forms the annular chamber 21. In other words, the seat 33 forms a gap at the centre of the protection element 20, which is surrounded by the annular chamber 21. The base 34 of the filter bag 9 is partly inserted in that gap, in such a way that it substantially occupies the corresponding space.

In fact, advantageously, the filter bag 9 has a cross-section, assessed perpendicularly to the axis of extension 8, which varies. In more detail, the filter bag 9 comprises an upper part 36 and a lower part 37, the upper part 36 having, perpendicularly to the axis of extension 8, a cross-section greater than that of the lower part 37. In the preferred embodiments illustrated, in particular, the filter bag 9 comprises at an intermediate portion of it a narrowing 35 of the cross-section forming in the filter bag 9 the upper part 36, between the upper opening 10 and the narrowing 35, and the lower part 37, between the narrowing 35 and a base 34 of the filter bag 9. In particular, the cross-section of the lower part 37 is less than that of the upper part 36, that is to say, the upper part 36 has, perpendicularly to the axis of extension 8, a cross-section which at every point, with reference to the axis of extension 8, is greater than that at every point of the lower part 37. In other words, proceeding from the upper opening 10 towards the base 34, the cross-section of the filter bag 9 is subject to a narrowing 35 beyond which the cross-section remains not greater than that at the narrowing 35. Advantageously, as already indicated, the filter bag 9 is connected to the lateral wall 5 substantially at the perimeter delimiting the upper opening 10 and its cross-section varies, being substantially reduced following that of the lateral wall 5 as far as the narrowing 35. The filter bag 9 is advantageously made in such a way that the narrowing 35 is located at the seat 33. That is to say, in the embodiments illustrated in FIGS. 1 and 3 the narrowing 35 is substantially slightly distanced from the protection element 20 and in particular from the connecting portion 28. The narrowing 35 of the cross-section is such that the lower part 37 of the filter bag 9 can be inserted in the seat 33. In fact, advantageously, the lower part 37 of the filter bag 9 is substantially inserted in the seat 33, that is to say, in the gap.

Advantageously, the shape and size of the cross-sections (perpendicularly to the axis of extension 8) of the lower part 37 of the filter bag 9 are substantially and respectively shaped and sized to match those of the seat 33. Said shape of the filter bag 9 allows the quantity of powdered food substance which can be contained in it to be maximised.

Advantageously, the filter bag 9 remains slightly distanced from the lateral wall 5, at the upper part 36 (excluding the portion to which it is connected), and from the protection element 20, at the narrowing 35 and at the lower part 37, and from the lower wall 4 at the base 34. In fact, in that way the passage of the beverage through the filter bag 9 occurs substantially at the totality of the filtering surface of the filter bag 9. However, in other embodiments the filter bag 9 may be in contact at one or more points with the body 3 of the capsule 2 and/or with the protection element 20. For example, the filter bag 9 may rest, at the narrowing 35, on the protection element 20 and in particular on the connecting portion 28 at a third outer face 38 of it, located on the opposite side to the third inner face 30.

Moreover, the lower part 37 of the filter bag 9 may be in contact with what delimits the seat 33, for example with the portion of the protection element 20 delimiting the seat 33.

Advantageously, the seat 33 is laterally delimited by the second wall 25. Even more advantageously, in the preferred embodiment illustrated in the accompanying drawings, the second wall 25 substantially delimits said seat 33 with its second outer face 27. Therefore, in the embodiments in which the filter bag 9, at the lower part 37, is in contact with the portion of the protection element 20 delimiting the seat 33, it will be in contact with the second outer face 27.

In the accompanying drawings the second wall 25 extends transversally to the lower wall 4: for example in FIGS. 1 to 3 it should be noticed how the second wall 25 extends away from the lower wall 4 and from the axis of extension 8, whilst in FIG. 6 the second wall 25 is substantially parallel with the axis of extension 8. Advantageously the shape of the second wall 25 and in particular of the second outer face 27 defines the shape of the sides of the seat 33. Seen according to a plane passing through the axis of extension 8, the second wall 25 and in particular the second outer face 27 may have, as is the case in the accompanying drawings, a profile which is flat, or curved (with the concavity facing towards the axis of extension 8 or the opposite way), shaped, etc. At the second outer face 27 there may advantageously be projections or recesses. Clearly, the shaping of the second inner face 26 and the shaping of the second outer face 27 may also not match each other. For example, they may have two opposite convexities, or the two faces may have different shapes.

What has been said relative to the second wall 25 regarding the profile of the second faces also applies with reference to the first inner face 23 and to the first outer face 24 of the first wall 22.

In alternative embodiments the seat 33 may have a shape, see according to the direction identified by the axis of extension 8, which differs from that of the protection element 20. For example, if the protection element 20 is substantially circular, the seat 33 may be square. Therefore, in particular the shape of the extension of the second wall 25 may differ from that of the extension of the first wall 22 and vice versa.

The seat 33 may be delimited at the bottom by the protection element 20 by means of a base wall (not illustrated) and connected to the second wall 25. The base wall may have holes made in it and/or may be in contact with the lower wall 4. However, in the preferred embodiments illustrated the seat 33 is delimited at the bottom by the lower wall 4.

In fact, advantageously, in the preferred embodiments (as is clearly shown in FIGS. 4 and 5), the protection element 20 has, centrally relative to the annular chamber 21 and at the seat 33, a central opening 39 whose perimeter is distanced from the lower wall 4, allowing fluid communication between the inside of the annular chamber 21 and the rest of the inside of the body 3 of the capsule 2 (therefore with the filter bag 9).

Advantageously, the perimeter of the central opening 39 is formed at an edge 29 of the second wall 25. In fact, in the preferred embodiments, the second wall 25 is distanced from the lower wall 4, and one edge 29 of it, located on the second wall 25 substantially at the end opposite to the connecting portion 28, forms the perimeter of the central opening 39. In this case, advantageously, the protection element 20 is in contact, in the way specified above, with the body 3 of the capsule 2 at the first contact portion 31. Therefore, the annular chamber 21 is partly open on one side at a substantially annular zone located between the lower wall 4 and the edge 29 of the second wall 25 opposite to the connecting portion 28. The central opening 39 may be present either in place of the first passages 32, or in addition to them. In the preferred embodiment, illustrated in FIG. 1 (with the corresponding protection element 20 illustrated in FIGS. 4 and 5), both the first passages 32 and the central opening 39 are present.

In an alternative embodiment, not illustrated, the second wall 25 forms, at the edge 29, a second contact portion which is substantially in contact with the lower wall 4. The second contact portion is substantially similar to the first contact portion 31. In this embodiment only the second contact portion can be in contact with the body 3 of the capsule 2 and specifically with the lower wall 4. However, even the first contact portion 31 can be in contact with the body 3 of the capsule 2, at the lateral wall 5 or the lower wall 4. Fluid communication is guaranteed for example by the first passages 32, if the first contact portion 31 is in contact with the body 3 of the capsule 2, or it is guaranteed by the space existing between the first contact portion 31 and the body 3 of the capsule 2. In any case, similarly to the first contact portion 31, the protection element 20 may comprise one or more second passages made at the second contact portion (advantageously extending on the second wall 25), which allow the fluid communication. In this embodiment there may be only the first passages 32, only the second passages or both.

In any case, the protection element 20 may advantageously comprise one or more holes 40 through which the fluid communication is allowed (FIGS. 3 and 6). Said holes 40 may be present as an alternative to or in addition to the first passages 32 and/or the second passages and/or the central opening 39. Said holes 40 may be positioned at various points of the protection element 20. For example, both in FIG. 3 and in FIG. 6 they are made at the connecting portion 28.

Below is a more detailed illustration of operation of the system 1 according to this invention.

When the capsule holder 11 and the contact element 15 are in the open position the capsule 2 can be inserted in the housing 12 formed by the capsule holder 11, through the entrance. The capsule holder 11 and the contact element 15 are brought to the closed position. During said switch or following it, the injection needle 14 penetrates the capsule 2 through the lid 7 and the piercing element 17 penetrates the capsule 2 through the lower wall 4. In particular, the piercing element 17 penetrates inside the capsule 2 and is positioned inside the annular chamber 21, that is to say, between the protection element 20 and the lower wall 4.

The injection means 13, advantageously through the injection needle 14, inject water into the capsule 2 at the upper opening 10 of the filter bag 9. The water permeates the powdered food substance, for extracting it and making a beverage. The flow of the beverage proceeds substantially from the lid 7 towards the lower wall 4. The beverage is then filtered by the filter bag 9 and the powdered food substance remains trapped inside the filter bag 9 between the bag and the lid 7. The beverage obtained in this way accumulates towards the lower wall 4 at the protection element 20. Thanks to the fluid communication between the annular chamber 21 and the space of the body 3 of the capsule 2 in which the filter bag 9 is located, the beverage can enter the annular chamber 21. Depending on the embodiments, fluid communication is allowed in various ways described above. At the annular chamber 21 the beverage can then come out of the capsule 2. For example, if the piercing element 17 is a hollow needle, the beverage may come out through it. In contrast, if the piercing element 17 acts as a simple punch, the beverage will be able to come out through the hole it has made.

This invention brings important advantages.

The system according to this invention allows the filter bag to be kept intact during the penetration by the piercing element.

Moreover, the combination of the annular chamber, the seat and the off centre positioning of the piercing element allows a large quantity of powdered food substance to be stored. In fact, in this way the filter bag can be shaped in such a way that it also occupies the space, or rather the void, corresponding to the seat, thereby maximising the space available for containing powdered food substance.

Moreover, the system according to this invention allows homogeneous permeation of the powdered food substance by the water injected by the injection means. In fact, the powdered food substance is positioned evenly in the filter bag and during operation is not subjected to any unwanted local compression.

Finally, it should be noticed that this invention is relatively easy to produce and that even the cost linked to implementing the invention is not very high.

The invention described above may be modified and adapted in several ways without thereby departing from the scope of the inventive concept.

Moreover, all details of the invention may be substituted with other technically equivalent elements and the materials used, as well as the shapes and dimensions of the various components, may vary according to requirements.

The invention claimed is:

1. A system (1) for making beverages comprising:
a capsule (2) containing at least one powdered food substance configured to be extracted by passing water through the at least one powdered food substance to make a beverage; the capsule (2) comprising a cup-shaped body (3) in turn comprising a lower wall (4) and a lateral wall (5) connected directly to the lower wall (4), the capsule (2) also comprising a lid (7) which closes the top of the cup-shaped body (3), and a filter bag (9) inserted in the cup-shaped body (3) for separating the at least one powdered food substance at least from the lower wall (4); there being a capsule (2) axis of extension (8) passing through a central point of the lid (7) and through a central point of the lower wall (4);
a capsule holder (11) forming a housing (12) for accommodating the capsule (2);
injection means (13) for injecting water into the capsule (2), the injection means being associated with the capsule holder (11) for injecting said water into the capsule (2) through the lid (7); and
collecting means (16) for collecting the beverage which are mounted in the capsule holder (11) at the housing (12) for, in use, collecting the beverage which comes out through the lower wall (4), the collecting means (16) comprising at least one piercing element (17) for, in use, making a hole in the lower wall (4) through which the beverage exits the capsule (2),
wherein the capsule (2) also comprises a protection element (20) formed as a unitary body that is separate and distinct from the cup-shaped body (3), the protection element (20) positioned in contact with the lower wall (4) or the lateral wall (5) inside the cup-shaped body (3) for preventing contact between the at least one piercing element (17) and the filter bag (9),
wherein the protection element (20) is configured to define an annular chamber (21) between the lower wall (4) of the cup-shaped body (3) and a portion of the protection element (20) that is axially offset from said lower wall toward said lid, said annular chamber (21) being inside the cup-shaped body (3) between the lower wall (4) and the lid (7), extending completely around the capsule axis of extension (8), and being in fluid communication with the filter bag (9),
wherein the protection element (20) forms a seat (33) for the filter bag (9), the seat (33) facing towards the lid (7) and being located, relative to the capsule axis of extension (8), radially inside the annular chamber (21), and wherein the annular chamber (21) surrounds the seat,
wherein, when the capsule (2) is inserted in the housing (12), the at least one piercing element (17) is positioned off centre relative to the capsule axis of extension (8), passes through the lower wall (4), and is partly inserted in the cup-shaped body (3) at the annular chamber (21),
wherein the filter bag (9) comprises an upper part (36) and a lower part (37), the upper part (36) having, perpendicularly to the capsule axis of extension (8), a cross-section greater than that of the lower part (37), and the lower part (37) being inserted in said seat (33), wherein proceeding from the lateral wall (5) towards the capsule axis of extension (8), the protection element (20) comprises an annular first wall (22), having a first outer face (24) and a first inner face (23), and an annular second wall (25), having a second inner face (26) and a second outer face (27), the annular second wall (25) being connected to the annular first wall (22) by said portion of the protection element, in which said portion of the protection element is an annular connecting portion (28), at least one of the annular first wall (22) and the annular second wall (25) extending away from the lower wall (4), wherein the annular connecting portion, the annular first wall (22) and the annular second wall (25) define the annular chamber (21) between the first inner face (23) and the second inner face (26).

2. The system according to claim 1, characterised in that the annular first wall (22) comprises, at the end opposite to the annular connecting portion (28), a first contact portion (31), and in that the protection element (20) is substantially in contact with the cup-shaped body (3) of the capsule (2) by means of the first wall (22) at the first contact portion (31).

3. The system according to claim 2, characterised in that the first contact portion (31) is substantially in contact with the lower wall (4) or with the lateral wall (5).

4. The system according to claim 2, characterised in that the protection element (20) comprises one or more first passages (32) made at the first contact portion (31), the one or more first passages (32) allowing said fluid communication.

5. The system according to claim 1, characterised in that the annular second wall (25) substantially delimits the seat (33) with the second outer face (27).

6. The system according to claim 1, characterised in that the protection element (20) comprises, centrally relative to the annular chamber (21) and at the seat (33), a central opening (39) whose perimeter is distanced from the lower wall (4), allowing said fluid communication.

7. The system according to claim 1, characterised in that the protection element (20) comprises, centrally relative to the annular chamber (21) and at the seat (33), a central opening (39) whose perimeter is distanced from the lower wall (4), allowing said fluid communication and in that the annular second wall (25) is distanced from the lower wall (4), one edge (29) of the annular second wall (25) opposite to the annular connecting portion (28) forming a perimeter of the central opening (39).

8. The system according to claim 2, characterised in that an edge (29) of the annular second wall (25), which is opposite to the annular connecting portion (28), forms a second contact portion which is substantially in contact with the lower wall (4).

9. The system according to claim 8, characterised in that the protection element (20) comprises one or more second passages made at the second contact portion, the one or more second passages allowing said fluid communication.

10. The system according to claim 1, characterised in that the protection element (20) comprises one or more holes (40) through which said fluid communication is allowed.

11. The system according to claim 1, characterised in that the protection element (20) forms the annular chamber (21) between the protection element, the lower wall (4), and the lateral wall (5).

12. The system according to claim 1, characterised in that the filter bag (9) comprises an upper opening (10) facing towards the lid (7), the filter bag (9) containing the at least one powdered food substance between the filter bag and at least the lid (7), and in that the filter bag (9) is connected to the lateral wall (5) or to the lid (7) substantially at a perimeter of the upper opening (10).

13. The system according to claim 12, characterised in that the filter bag (9) comprises a narrowing (35) of the cross-section located at an intermediate portion of the filter bag (9), the intermediate portion located between the upper part (36) of the filter bag (9) and the lower part (37) of the filter bag (9), the upper part (36) of the filter bag (9) extending between the upper opening (10) and the narrowing (35), and the lower part (37) of the filter bag (9) extending between the narrowing (35) and a base (34) of the filter bag (9), said upper part (36) having, perpendicularly to the capsule axis of extension (8), a cross-section which at every point of the capsule axis of extension (8), is greater than any cross-section of the lower part (37) perpendicularly to the capsule axis of extension (8), the narrowing (35) being located close to the protection element (20) at the seat (33).

14. A capsule for making beverages containing at least one powdered food substance to be extracted by passing water through the at least one powdered food substance to make a beverage; the capsule (2) comprising:

a cup-shaped body (3) comprising a lower wall (4) and a lateral wall (5) connected directly to the lower wall (4);

a lid (7) which closes the top of the cup-shaped body (3);

a filter bag (9) positioned inside the cup-shaped body (3) for separating the at least one powdered food substance at least from the lower wall (4), wherein a capsule (2) axis of extension (8) passes through a central point of the lid (7) and through a central point of the lower wall (4); and a protection element (20) formed as a unitary body that is separate and distinct from the cup-shaped body (3), the protection element (20) positioned in contact with the lower wall (4) or the lateral wall (5) inside the cup-shaped body (3), the protection element (20) configured to define an annular chamber (21) between the lower wall (4) of the cup-shaped body (3) and a portion of the protection element (20) that is axially offset from said lower wall toward said lid, said annular chamber (21) being inside the cup-shaped body (3) between the lower wall (4) and the lid (7), extending completely around the capsule axis of extension (8), and being in fluid communication with the filter bag (9), the protection element (20) also forming a seat (33) for the filter bag (9), the seat (33) facing towards the lid (7) and being located, relative to the capsule axis of extension (8), radially inside the annular chamber (21), and wherein the annular chamber (21) surrounds the seat, wherein the filter bag (9) comprises an upper part (36) and a lower part (37), the upper part (36) having, perpendicularly to the capsule axis of extension (8), a cross-section greater than that of the lower part (37), and the lower part (37) being inserted in said seat (33), wherein proceeding from the lateral wall (5) towards the capsule axis of extension (8), the protection element (20) comprises an annular first wall (22), having a first outer face (24) and a first inner face (23), and an annular second wall (25), having a second inner face (26) and a second outer face (27), the annular second wall (25) being connected to the annular first wall (22) by said portion of the protection element, in which said portion of the protection element is an annular connecting portion (28), at least one of the annular first wall (22) and the annular second wall (25) extending away from the lower wall (4), and wherein the annular connecting portion, the annular first wall (22) and the annular second wall (25) define the annular chamber (21) between the first inner face (23) and the second inner face (26).

15. The capsule according to claim 14, characterised in that the annular first wall (22) comprises, at the end opposite to the annular connecting portion (28), a first contact portion (31), and in that the protection element (20) is substantially in contact with the cup-shaped body (3) of the capsule (2) by means of the annular first wall (22) at the first contact portion (31), wherein the first contact portion (31) is substantially in contact with the lower wall (4) or with the lateral wall (5) or wherein the protection element (20) comprises one or more first passages (32) made at the first contact portion (31), the one of more first passages (32) allowing said fluid communication.

16. The capsule according to claim 14, characterised in that the protection element (20) comprises, centrally relative to the annular chamber (21) and at the seat (33), a central opening (39) whose perimeter is distanced from the lower wall (4), allowing said fluid communication and in that the annular second wall (25) is distanced from the lower wall (4), one edge (29) of the annular second wall (25) opposite to the annular connecting portion (28) forming a perimeter of the central opening (39).

17. The capsule according to claim 14, characterised in that the filter bag (9) comprises an upper opening (10) facing towards the lid (7), the filter bag (9) containing the at least one powdered food substance between the filter bag and at least the lid (7), and in that the filter bag (9) is connected to the lateral wall (5) or to the lid (7) substantially at a perimeter of the upper opening (10).

18. The capsule according to claim 17, characterised in that the filter bag (9) comprises a narrowing (35) of the cross-section located at an intermediate portion of the filter bag, said narrowing (35) the upper part (36) of the filter bag extending between the upper opening (10) and the narrowing (35), and the lower part (37) of the filter bag extending between the narrowing (35) and a base (34) of the filter bag (9), said upper part (36) having, perpendicularly to the capsule axis of extension (8), a cross-section which at every point of the capsule axis of extension (8), is greater than any cross-section of the lower part (37) perpendicularly to the capsule axis of extension (8), the narrowing (35) being located close to the protection element (20) at the seat (33).

* * * * *